United States Patent
Mahajan et al.

(10) Patent No.: US 11,556,455 B2
(45) Date of Patent: Jan. 17, 2023

(54) AUTOMATED IDENTIFICATION OF POSTS RELATED TO SOFTWARE PATCHES

(71) Applicant: FUJITSU LIMITED, Kawasaki (JP)

(72) Inventors: Sonal Mahajan, Fremont, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/985,171

(22) Filed: Aug. 4, 2020

(65) Prior Publication Data
US 2022/0043738 A1 Feb. 10, 2022

(51) Int. Cl.
*G06F 11/36* (2006.01)

(52) U.S. Cl.
CPC .............................. *G06F 11/3624* (2013.01)

(58) Field of Classification Search
CPC .. G06F 11/36; G06F 11/3624; G06F 11/3664; G06F 11/3672; G06F 11/3684; G06F 11/3688; G06F 9/44521; G06F 9/44536; G06F 9/45529; G06F 8/33; G06F 8/41; G06F 8/43; G06F 11/3604; G06F 8/71; G06F 8/75; G06F 8/751; G06F 21/55; G06F 21/562; G06F 21/563; G06F 21/577; H04L 63/1433
USPC ....................................................... 717/124
See application file for complete search history.

(56) References Cited

U.S. PATENT DOCUMENTS

| | | | | |
|---|---|---|---|---|
| 2010/0050154 A1* | 2/2010 | Balasubramanian | ..... | G06F 8/33 717/113 |
| 2011/0246968 A1* | 10/2011 | Zhang et al. | ............ | G06F 8/71 717/125 |
| 2013/0179863 A1* | 7/2013 | Vangala et al. | ........... | G06F 8/74 717/124 |

(Continued)

OTHER PUBLICATIONS

Luca Ponzanelli et al. "Mining StackOverflow to Turn the IDE into a Self-confident Programming Prompter" In Proceedings of the 11th Working Conference on Mining Software Repositories (Hyderabad, India) (MSR 2014). ACM, New York, NY, USA, 102-111. May 31, 2014.

(Continued)

*Primary Examiner* — Wei Y Zhen
*Assistant Examiner* — Mohammed N Huda
(74) *Attorney, Agent, or Firm* — Maschoff Brennan

(57) ABSTRACT

Operations may include obtaining a buggy code snippet of source code of a software program in which the buggy code snippet includes a particular error. The operations may also include determining a respective first similarity between the buggy code snippet and a plurality of bug patterns of previously identified bug scenarios. In addition, the operations may include selecting a particular bug pattern based on a determined particular first similarity between the particular bug pattern and the buggy code snippet. Moreover, the operations may include determining a respective second similarity between the particular bug pattern and example code snippets obtained from a plurality of posts. The operations may also include selecting a particular post as provid- (Continued)

ing a potential solution to correct the particular error based on a determined particular second similarity between the particular bug pattern and a particular example code snippet of the particular post.

15 Claims, 6 Drawing Sheets

(56) References Cited

U.S. PATENT DOCUMENTS

2017/0185783 A1* 6/2017 Brucker et al. ....... G06F 21/577
2020/0065226 A1* 2/2020 Saha et al. .......... G06F 11/3604

OTHER PUBLICATIONS

Luca Ponzanelli et al. "Supporting Software Developers with a Holistic Recommender System" In Proceedings of the 39th International Conference on Software Engineering (Buenos Aires, Argentina) (ICSE '17). IEEE Press, Piscataway NJ, USA, 94-105. May 2017.
Tianyi Zhang et al. "Analyzing and Supporting Adaptation of Online Code Examples" In Proceedings of the 41st International Conference on Software Engineering (Montreal, Quebec, Canada) (ICSE '19). IEEE Press, Piscataway, NJ, USA, 316-327. May 2019.
X. Liu et al. "Mining stackoverflow for program repair" In 2018 IEEE 25th International Conference on Software Analysis, Evolution and Reengineering (SANER). 118-129. Mar. 2018.
Qing Gao et al. "Fixing Recurring Crash Bugs via Analyzing Q&A Sites" In Proceedings of the 2015 30th IEEE/ACM International Conference on Automated Software Engineering (ASE) (ASE '15). IEEE Computer Society, Washington, DC, USA, 307-318. Nov. 2015.
Kisub Kim et al. "FaCoY: A Code-to-code Search Engine" In Proceedings of the 40th International Conference on Software Engineering (Gothenburg, Sweden) (ICSE '18). ACM, New York, NY, USA, 946-957. May 2018.
Fuxiang Chen et al. "Crowd Debugging" In Proceedings of the 2015 10th Joint Meeting on Foundations of Software Engineering (ESEC/FSE '15). ACM, New York, NY, USA. Aug. 2015.
Di Yang et al. "From Query to Usable Code: An Analysis of Stack Overflow Code Snippets" In Proceedings of the 13th International Conference on Mining Software Repositories (MSR '16). ACM, New York, NY, USA. May 14, 2016.
Valerio Terragni et al. "CSNIPPEX: Automated Synthesis of Compilable Code Snippets from Q&A Sites" In Proceedings of the 25th International Symposium on Software Testing and Analysis (ISSTA 2016). ACM, New York, NY, USA, 118-129. Jul. 2016.
Siddharth Subramanian et al. "Live API Documentation" In Proceedings of the 36th International Conference on Software Engineering (ICSE '14). ACM, New York, NY, USA. May 31, 2014.

Hao Zhong et al. "Detecting API Documentation Errors" In Proceedings of the 2013 ACM SIGPLAN International Conference on Object Oriented Programming Systems Languages & Applications (OOPSLA '13). ACM, New York, NY, USA. Oct. 2013.
Barthelemy Dagenais et al. "Recovering Traceability Links between an API and Its Learning Resources" In Proceedings of the 34th International Conference on Software Engineering (ICSE '12). IEEE Press. pp. 47-57 Jun. 2012.
Westley Weimer et al. "Automatically Finding Patches Using Genetic Programming" In Proceedings of the 31st International Conference on Software Engineering (ICSE). 364-374. May 2009.
Claire Le Goues et al. "A Systematic Study of Automated Program Repair: Fixing 55 out of 105 Bugs for $8 Each" In Proceedings of the 34th International Conference on Sofware Engineering (ICSE). 3-13. 2012.
Zichao Qi et al. "An analysis of patch plausibility and correctness for generate-and-validate patch generation systems" In Proceedings of the 2015 International Symposium on Software Testing and Analysis (ISSTA 2015). Association for Computing Machinery, New York, NY, USA, 24-36. Jul. 12, 2015.
Fan Long et al. "Automatic patch generation by learning correct code" In Proceedings of the 43rd Annual ACM SIGPLAN-SIGACT Symposium on Principles of Programming Languages (POPL '16). Association for Computing Machinery, New York, NY, USA, 298-312. Jan. 2016.
Dongsun Kim et al. "Automatic patch generation learned from human-written patches," 2013 35th International Conference on Software Engineering (ICSE), San Francisco, CA, 2013, pp. 802-811. May 2013.
Thomas Durieux et al. "Dynamic Patch Generation for Null Pointer Exceptions Using Metaprogramming" In Proceedings of the 24th IEEE International Conference on Software Analysis, Evolution and Reengineering (SANER '17). IEEE, Klagenfurt, Austria, 349-358. Feb. 2017.
Ripon K. Saha et al. "ELIXIR: effective object oriented program repair" In Proceedings of the 32nd IEEE/ACM International Conference on Automated Software Engineering (ASE 2017). IEEE Press, 648-659. Oct. 2017.
Fan Long et al. "Automatic inference of code transforms for patch generation" Proceedings of the 2017 11th Joint Meeting on Foundations of Software Engineering. Association for Computing Machinery, New York, NY, USA, 727-739. Sep. 2017.
Reudismam Rolim et al. "Learning syntactic program transformations from examples" In Proceedings of the 39th International Conference on Software Engineering (ICSE '17). IEEE Press, 404-415. May 2017.
Rohan Bavishi et al. "Phoenix: automated data-driven synthesis of repairs for static analysis violations" In Proceedings of the 2019 27th ACM Joint Meeting on European Software Engineering Conference and Symposium on the Foundations of Software Engineering (ESEC/FSE 2019). Association for Computing Machinery, New York, 613-624. Aug. 2019.

* cited by examiner

FIG. 1B

*164 — ClassCastException*
```
List $v1;
*[] $v2 = (*[]) $v1.toArray();

URL $v1;
(HttpURLConnection) $v1.openConnection();

* $v;
(_{Long, Double, Integer}__) $v;

String $v1; * $v2;
String.format($v1, $v2);

(Activity) *.getContext();
```

*166 — IllegalArgumentException*
```
ProgressDialog $v;
$v.dismiss();

Object $v1;
$v1.wait(NEGATIVE);

String $v1, $v2;
URLDecoder.decode($v1, $v2);
```

*160 — UnsupportedOperationException*
```
List $v = Arrays.asList(*);
$v.__{add|remove|clear|addAll|removeAll}__ (*);

List $v = Collections.singletonList(*);
$v.__{add|remove|clear|addAll|removeAll}__ (*);

CopyOnWriteArrayList $v;
Collections.sort($v);
```

*162 — ConcurrentModificationException*
```
__{Collection, List, Map, Set}__ $v;
loop($v) {
  $v.__{add, remove, clear, addAll, removeall}__(*);
}

Iterator $v1 = __{Collection, List, Map, Set}__.iterator();
loop($v1.hasNext()) {
  *$v2 = $v1.next();
  $v1.remove();
}
```

AUTOMATED IDENTIFICATION OF POSTS RELATED TO SOFTWARE PATCHES

FIELD

The embodiments discussed in the present disclosure are related to automated identification of posts related to software patches.

BACKGROUND

Software developer forums present a rich, hybrid knowledge base of natural language descriptions and code snippets related to developing software programs such as fixing errors (also referred to as bugs or errors) in the software programs. Software development tools may be configured to perform machine analysis operations to analyze posts of the forums to identify which posts may be relevant to correcting particular errors.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

Operations may include obtaining a buggy code snippet of source code of a software program in which the buggy code snippet includes a particular error. The operations may also include determining a respective first similarity between the buggy code snippet and each of a plurality of bug patterns of previously identified bug scenarios. In addition, the operations may include selecting a particular bug pattern from the plurality of bug patterns based on a determined particular first similarity between the particular bug pattern and the buggy code snippet. Moreover, the operations may include determining a respective second similarity between the particular bug pattern and each of a plurality of example code snippets each obtained from a respective post of a plurality of posts obtained from one or more websites. The operations may also include selecting, from the plurality of posts, a particular post as providing a potential solution to correct the particular error of the buggy code snippet based on a determined particular second similarity between the particular bug pattern and a particular example code snippet of the particular post.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
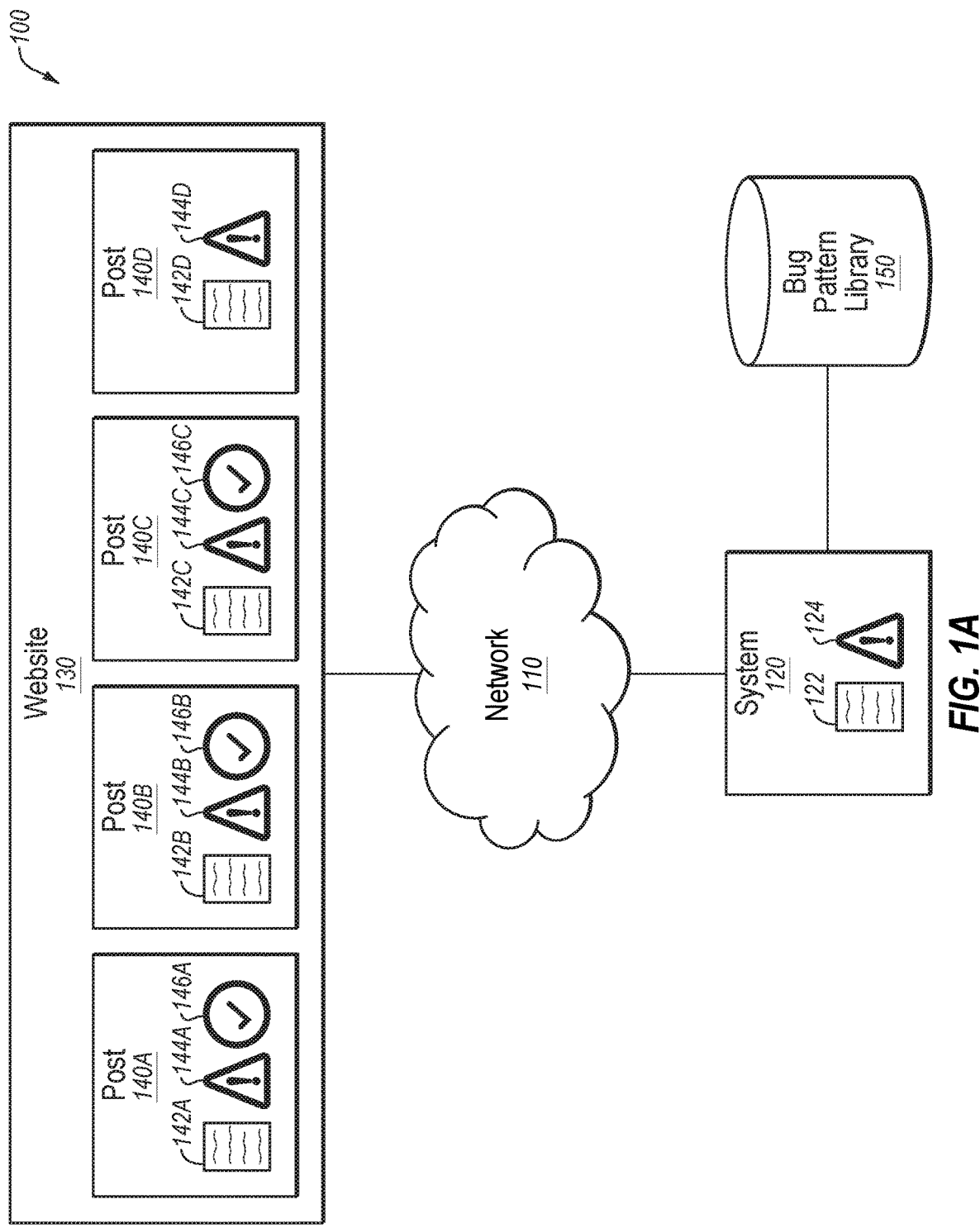
FIG. 1A is a diagram representing an example environment related to automated identification of posts related to software patches.
FIG. 1B illustrates example bug patterns for example types of errors that may be included in the bug pattern library of FIG. 1A.

Some embodiments described in the present disclosure relate to methods and systems of identifying posts within developer forums that may relate to software patches in that the posts may each describe how to correct a certain type of error (also referred to as a bug or violation) in a software program. In particular, as described in detail below, bug patterns of relatively common bug scenarios, which may be stored in a library, may be compared against a buggy code snippet of a source code of a software program to identify which of the bug patterns may be most similar to the buggy code snippet. In addition, the identified bug pattern may then be compared against example code snippets of posts on one or more developer forums that may relate to repairing errors in software programs to identify a particular post that may provide a potential solution to an error of the buggy code snippet.

The identified particular post and corresponding code snippet of the particular post may then be used in the development of software programs. For example, repair strategies for a software program in development may be identified from the particular post. For instance, the corresponding code snippet may include a patch (also referred to as a "repair") for a particular bug included in the software program in development. The above is merely one example of how the parsable code snippet may be used by a software development tool in debugging (e.g., identifying errors, repairing errors, etc.) of the software program in development.

As such, according to one or more embodiments of the present disclosure, the technological field of software development may be improved by configuring a computer system in a manner in which the computing system is able to better identify posts and corresponding code snippets that may be used to identify patches in software programs.

Additionally, in some embodiments, the system may facilitate the development of software programs by finding particular posts and/or particular patches (e.g., from the particular posts) for errors in a software program in a particular manner. The system may find particular posts and/or patches that may be more suitable for and more relevant to a user's code than a user could find on his or her own. Additionally, the system may find posts and/or patches more quickly than a user. The improved relevancy of the posts and/or patches may help remediate software errors. Speed of identification of potential posts and/or patches to remediate a software error may help facilitate the development and testing of source code. In these and other embodiments, a user may more efficiently develop code by focusing on writing the code instead of bug-fixing, which may often occupy a large fraction of a user's time.

Alternatively or additionally, the system may identify more accurate and/or more relevant posts and/or patches for the software program than a user may identify. The identification of more accurate and/or more relevant posts and/or patches may help a user write more efficient code or code that operates in a manner intended by a user. The improved identification of posts and/or patches for a software program may thus facilitate the correction of the error and consequently may help improve the particular source code.

Embodiments of the present disclosure are explained with reference to the accompanying drawings.

FIG. 1A is a diagram representing an example environment 100 related to automated identification of posts related to software patches, arranged in accordance with at least one embodiment described in the present disclosure. The environment 100 may include a network 110, a system 120, and a website 130.

The network 110 may include any communication network configured for communication of signals between any of the components (e.g., the system 120 and the website 130) of the environment 100. The network 110 may be wired or wireless. The network 110 may have numerous configurations including a star configuration, a token ring configuration, or another suitable configuration. Furthermore, the network 110 may include a local area network (LAN), a wide area network (WAN) (e.g., the Internet), and/or other interconnected data paths across which multiple devices may communicate. In some embodiments, the network 110 may include a peer-to-peer network. The network 110 may also be coupled to or include portions of a telecommunications network that may enable communication of data in a variety of different communication protocols.

In some embodiments, the network 110 includes or is configured to include a BLUETOOTH® communication network, a Z-Wave® communication network, an Insteon® communication network, an EnOcean® communication network, a wireless fidelity (Wi-Fi) communication network, a ZigBee communication network, a HomePlug communication network, a Power-line Communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 110 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the system 120, the website 130, a cloud server communication, or a gateway.

The system 120 may include a computer-based hardware system that includes a processor, memory, and communication capabilities. The system 120 may be coupled to the network 110 to communicate data with any of the other components of the environment 100. Some examples of the system 120 may include a mobile phone, a smartphone, a tablet computer, a laptop computer, a desktop computer, a set-top box, a virtual-reality device, or a connected device, etc. Additionally or alternatively, the system 120 may include one or more processor-based computing systems. For example, the system 120 may include one or more hardware servers or other processor-based computing devices configured to function as a server. The system 120 may include memory and network communication capabilities. In some embodiments, the system 120 may include a computing system such as described below with respect to FIG. 2.

In some embodiments, the system 120 may include a software program 122. In these and other embodiments, the software program 122 may include source code written in any programming language such as, for example, C++, C, assembly, C#, Java, BASIC, JavaScript, Python, and SQL, among others. In some embodiments, the software program 122 may include multiple methods. In these and other embodiments, a method may be a discrete sub-program inside the software program 122 which may be independently executable and/or distinct. For example, a method may be a sub-unit of the software program 122. In these and other embodiments, the software program 122 may be designed for a particular purpose and/or to achieve a particular goal.

In some embodiments, the software program 122 may include an error 124. While a single error 124 is depicted in FIG. 1, the software program 122 may include any number of errors 124. In some embodiments, the errors 124 may include compilation errors, run-time errors, logic errors, and/or other errors. For example, in some embodiments, the error 124 may include a syntax error that may be detected by a compiler prior to execution of a program based on the software program 122. For example, punctuation marks may be missing in the software program 122 and/or a variable may be used without being declared. Alternatively or additionally, in some embodiments, the error 124 may include a run-time error. In these and other embodiments, the software program 122 may compile without any errors but errors may be encountered when attempting to execute the compiled software program 122. For example, the software program 122 may include division by zero or an attempt to access an element of an array that does not exist. Alternatively or additionally, in some embodiments, the error 124 may include a logic error. In these and other embodiments, the software program 122 may compile without any errors and no errors may be encountered when attempting to execute the compiled software program 122. However, the software program 122 may not function as anticipated by an author or designer of the software program 122. In such instances, the error 124 may include lines of code that cause the software program 122 to not function as anticipated.

In some embodiments, the error 124 may include different characteristics. For example, the error 124 may include a name of the error 124. Alternatively or additionally, in some embodiments, the error 124 may include a description of the error 124. For example, the description of the error 124 may include a type of the error 124. Alternatively or additionally, the error 124 may include a programming language. For example, the programming language may of the error 124 may be the same as the programming language of the software program 122. As an example, the error 124 may include a run-time exception. The name of the run-time exception may be "java.lang.ArrayIndexOutOfBoundsException." The description of the exception may be "Index 10 out of bounds for length 10." The type for the exception may be an out-of-bounds exception. The programming language for the exception may be the Java programming language.

The website 130 may include any applicable website on the Internet. Alternatively or additionally, in some embodiments the website 130 may include an internal repository or resource, such as a collection of documents on an internal intranet site. For example, in some embodiments, the website 130 may include a discussion forum where users may post questions and other users may post answers. For example, one user may post a question in the form of a software program that includes an error and another user may post an answer or patch to the question in the form of a corrected software program that no longer includes the error. In these and other embodiments, multiple users may post answers to the question and/or one user may post multiple answers. In some embodiments, the user who posted the question may select one answer as resolving the error the user experienced. In some embodiments, users of the website 130 may vote on different answers posted by users. While FIG. 1A depicts a single website 130, in some embodiments there may be multiple websites 130. In some embodiments, the website 130 may include multiple pages or multiple posts, such as the post 140A, the post 140B, the post 140C, and the post 140D (collectively the posts 140). While the website 130 is depicted with four posts 140, in some embodiments, the website 130 may include hundreds of posts 140, thousands of posts 140, hundreds of thousands of posts 140, or any number of posts 140. Furthermore, while the posts 140 are depicted as being associated with a single website 130, in some embodiments, some of the posts 140 may be associated with a first website and other posts 140 may be associated with a second website. For example, the post 140A and the post 140B may be associated with the website 130 while the post 140C and the post 140D may be associated with a different website.

In these and other embodiments, the posts 140 may each be associated with different software programs. For example, the post 140A may relate to a software program 142A, the post 140B may relate to a software program 142B, the post 140C may relate to a software program 142C, and the post 140D may relate to a software program 142D (collectively, the software programs 142). In some embodiments, reference to the software programs 142 may include references to lines of code of software programs. For example, the software program 142A may include multiple lines of a larger software program and may not include every line in the larger software program. In some embodiments, the software programs 142 may be the lines of code in larger software programs that include errors. Thus, references to the software programs 142 is not limited to entire programs. In these and other embodiments, the software programs 142 may each differ from each other and may differ from the software program 122. For example, the software programs 142 may each have a different purpose, have a different author, be written in a different programming language, or include different error types than the software program 122.

In some embodiments, the software programs 142 may be associated with different questions. For example, a user of the website 130 may create the post 140A on the website 130. As part of the post 140A, the user may add a software program 142A and may ask a question associated with the software program 142A. For example, the user may have experienced an error while writing the software program 142A. To obtain assistance, the user may post the software program 142A to the website 130 as part of the post 140A. The user may write a question to ask other users of the website 130 how the user may remediate the error and/or ask other users what is causing the error in the software program 142A.

In some embodiments, the software program 142A may include an error 144A, the software program 142B may include an error 144B, the software program 142C may include an error 144C, and the software program 142D may include an error 144D (collectively the errors 144). In some embodiments, each of the errors 144 may be different errors from each other. For example, the error 144A may be a run-time error, the error 144B may be a logic error, the error 144C may be a compilation error, and the error 144D may be a run-time error distinct from the error 144A. Alternatively or additionally, in some embodiments, one or more of the errors 144 may be the same error, may be related errors, and/or may be similar errors. For example, in some embodiments, the error 144A may be an index out of bounds error in the C++ programming language while the error 144C may be an index out of bounds error in the Java programming language. In this example, the error 144A and the error 144C may be similar errors. In some embodiments, errors 144 may be determined to be similar errors even if the errors are manifested and/or handled differently in different environments. For example, an array index out of bounds access may be manifested and handled differently during runtime in a C++ environment verses a Java environment, even though the root cause of the behavior may be the same, i.e. attempting to access an array out of its prescribed bound of indices.

In some embodiments, one or more of the posts 140 may include a patch. For example, the post 140A may include a patch 146A, the post 140B may include a patch 146B, and the post 140C may include a patch 146C (collectively the patches 146). In some embodiments, one or more posts 140 may not include an associated patch 146. For example, the post 140D may not include a patch. In some embodiments, the patches 146 may represent a method to remediate the corresponding errors 144, i.e. the patch 146A may remediate the errors 144A such that, after applying the patch 146A to the software program 142A, the software program 142A no longer has the errors 144A. In some embodiments, the patches 146 may include example code snippets of source code that may be applied to a source of the errors 144 in the software programs 142. In some embodiments, one or more of the posts 140 may include multiple patches 146. For example, the post 140B may include multiple patches 146B. In these and other embodiments, different users of the website 130 may rank or vote for different patches 146B, such that one patch 146B may receive the most positive votes. In these and other embodiments, one of the patches 146B may be selected as the chosen patch 146B by the user who created the post 140B based on the chosen patch solving that user's problem.

In some embodiments, the posts 140 may include questions. For example, the software programs 142 may be integrated into a question posted by a user of the website 130. For example, a first user may have written the software program 142A and have encountered the error 144A. The first user may then create a post 140A on the website 130 including the software program 142A, the errors 144A and details of the errors 144A, and a request for others to help resolve the errors 144A. In these and other embodiments, the patch 146A may represent an answer to the first user's question. For example, in these and other embodiments, a second user may add a patch 146A as an answer to the question in the post 140A.

A description of the operation of environment 100 follows. A user may write a software program 122 using the system 120. While writing the software program 122 or while testing the software program 122, the user may receive a notification of an error 124.

In some embodiments, the system 120 may then perform a search of a website 130 using a search query based on characteristics of the error 124 such as a name of the error 124, a type of the error 124, and/or a programming language associated with the software program 122 and/or the error 124. In some embodiments, the search query may include tags to indicate whether the search should include unanswered posts 140, answered posts 140, or both unanswered and answered posts 140. Based on the search query, a set of posts 140 may be identified. For example, the set of posts 140 may be identified based on each post in the set of posts 140 including an answer to a question, the question in the posts including a code snippet with an error with the same type and/or the same name as the error characteristics of the error 124, and the code snippet in the post being written in the same programming language as the error 124. The search may be considered a coarse search.

In these or other embodiments, each of the posts of the set of posts 140 may include an example code snippet. One or more of the example code snippets may include a solution to a problem that corresponds to the respective post. Additionally, one or more of the example code snippets and the corresponding posts may include information as a potential patch to the error 124. In these or other embodiments, the system 120 may be configured to extract the example code snippets from the posts of the set of posts 140.

Additionally, the system 120 may be configured to extract a buggy code snippet from the software program 122 that includes or causes the error 124. In some embodiments, the buggy code snippet may be extracted according to one or more operations described below with respect to FIG. 4

Further, the system 120 may be configured to access a bug pattern library 150. The bug pattern library 150 may be stored via any suitable computer-readable media and may be communicatively coupled to the system 120 (e.g., directly coupled and/or via the network 110). The bug pattern library 150 may include different patterns (referred to as "bug patterns") of scenarios (referred to as "bug scenarios") that may lead to different types of errors. The bug scenarios may include different conditions or characteristics of source code that may lead to a respective type of bug occurring in a corresponding software program. The bug patterns may relate to corresponding bug scenarios in that the respective bug patterns may indicate the relationships between the different conditions or characteristics of the bug scenarios to which the bug patterns may correspond.

In some embodiments, the bug patterns and corresponding bug scenarios of the bug pattern library 150 may include common scenarios that may lead to common types of errors. For example, some example scenarios may include unsupported operation exceptions, concurrent modification exceptions, class cast exceptions, illegal arguments exceptions, etc.

In some embodiments, the bug patterns of the bug pattern library 150 may be formatted according to a particular domain specific language (DSL) that is based on a syntax of a particular software language. For example, one or more bug patterns of the bug pattern library 150 that may provide bug scenarios related to Java may be formatted according to a particular DSL that is based on a Java-like syntax. In some embodiments, the bug pattern library 150 may include bug patterns formatted according to different DSL's that correspond to different software languages. In these or other embodiments, different bug patterns may correspond to same types of bugs but may be formatted according to different DSL's. Additionally or alternatively, some bug patterns may be specific to certain types of software languages and may therefore such bug patterns may only be formatted according to the respective DSL's of the software languages to which they may relate. The formatting of the bug patterns according to certain DSLs may be such that the bug patterns may be structured as genericized code snippets of source code of corresponding software programs.

In these or other embodiments, the formats of the DSL's may have some differences as compared to the syntax of the corresponding software language. For example, some of the syntax rules may be relaxed in a particular DSL as compared to a corresponding software language. For instance, a Java DSL may not have some of the strict formalism of Java such as enclosure of statements in a method and/or class.

As another example, the particular DSL may support semantic abstractions in which a particular semantic abstraction may be used to represent different program elements that are semantically equivalent with respect to each other in the context of the bug scenario of the respective bug pattern and in the context of the type of bug. In other words, the semantic abstractions encode a family of program elements that play an equivalent role for a specific kind of bug and its bug scenario, but may not be generally equivalent to each other.

For example, FIG. 1B illustrates an example bug pattern 160 for an unsupported operation exception, which may be a runtime exception bug. In the bug pattern 160, the methods "add( )", "remove( )", "clear( )" "addAll( )", and "removeAll" may each be deemed as semantic equivalents because in the context of an unsupported operation exception each of these methods represent a structural modification of a given "List" by adding or removing one or more of the elements of the "List." However, generally speaking some of the methods are actually performing different or even opposite operations—e.g., "add( )" and "remove( )" are actually performing opposite operations—and thus may not be considered semantic equivalents outside of the context of the bug scenario of the bug pattern 160.

Additionally or alternatively, the particular DSL may support a wildcard character that may match different program elements that may differ in one or more ways. For example, in the bug pattern 160 of FIG. 1B, the argument to the method "Arrays.asList( )" is a wildcard "*", as it may represent different program elements such as variables, creation of new array objects, or a return from a method call.

In these or other embodiments, the particular DSL may support numeric constraints on values. For example, FIG. 1B illustrates an example bug pattern 166 of an illegal argument exception. An argument to a method "wait( )" of the bug pattern 166 is a number value in which an illegal argument exception may occur if this value is less than zero. To represent this scenario, the argument to the method "wait( )" is specified with the numeric constraint of "NEGATIVE".

As indicated above, FIG. 1B illustrates some example bug patterns for some example types of errors that may be included in the bug pattern library 150 and that may be configured according to a Java DSL. For example, FIG. 1B illustrates the example bug pattern 160 for an unsupported operation exception, an example bug pattern 162 for a concurrent modification exception, an example bug pattern 164 for a class cast exception, and the example bug pattern 166 for an illegal argument exception, which may each be errors associated with Java code.

As indicated above, the system 120 may be configured to access the bug pattern library 150 to obtain one or more of the bug patterns included therein. In these or other embodiments, the system 120 may be configured to select a particular bug pattern that may be most related to the buggy code snippet of the software program that relates to the error 124. The system 120 may select the particular bug pattern as described in further detail below with respect to one or more operations of FIGS. 3 and 5.

The system 120 may also be configured to select a particular post from the set of posts 140 as providing a potential solution (e.g., patch) to correct the error 124. In some embodiments, the system 120 may be configured to select the particular post based on a relationship between a particular example code snippet of the particular post and the particular bug pattern. The system 120 may select the particular post as described in further detail below with respect to one or more operations of FIGS. 3 and 5.

In some embodiments, the system 120 may use the particular post to perform one or more repair operations that may be performed with respect to the error 124. For example, in some embodiments, the repair operations may include presenting the particular post on a display such as, for example, a computer screen connected to the system 120. A developer of the software program 122 may then repair the software program 122 based on the particular post. Alternatively or additionally, in some embodiments, the repair operations may include the system 120 repairing the software program 122 based on the particular post. For example, the particular post may include an example code snippet that is a patch for the error 124. In these or other embodiments, the system 120 may be configured to apply the example code snippet to the software program 122 by modifying the source code of the software program 122 according to the example code snippet to apply the corresponding patch and correct the error 124.

Modifications, additions, or omissions may be made to FIG. 1A without departing from the scope of the present disclosure. For example, the environment 100 may include more or fewer elements than those illustrated and described in the present disclosure. Moreover, in some embodiments, the software program 122 may be created and edited using a device or system different from the system 120. For example, in these and other embodiments, the user may use a system or device other than the system 120 to create and/or edit the software program 122 and the system 120 may perform a search of the website 130 and identify posts 140 based on the error 124.

Alternatively or additionally, in some embodiments, the system 120 and the operations discussed relative to the system 120 may be performed by a single device or distributed across different systems. In these and other embodiments, the environment 100 may include the network 110 and one or more systems, including the system 120 and the website 130, which may be communicatively coupled via the network 110.

Figure 2:
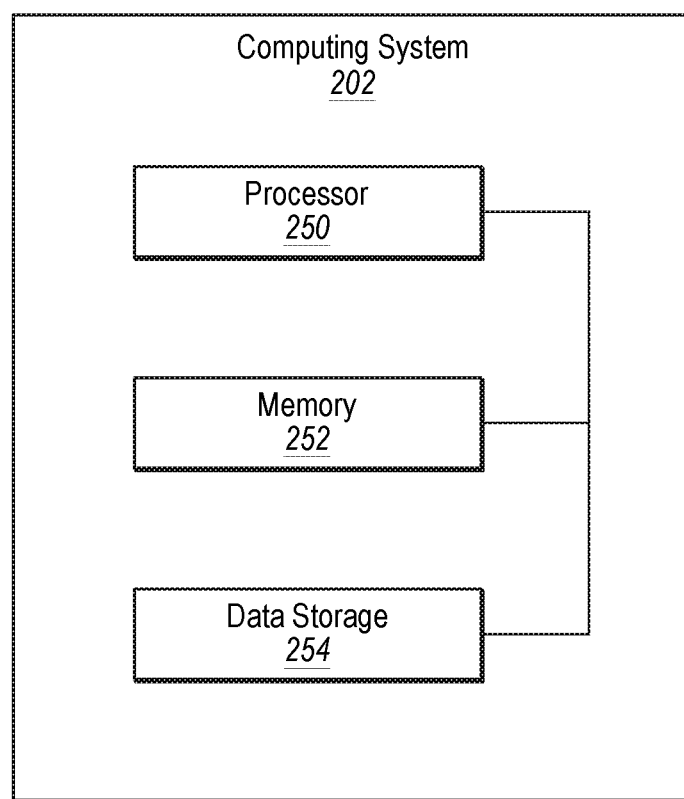
FIG. 2 illustrates a block diagram of an example computing system that may be used to identify posts related to software patches.

FIG. 2 illustrates a block diagram of an example computing system 202 that may be used to identify posts related to software patches, according to at least one embodiment of the present disclosure. The computing system 202 may be configured to implement or direct one or more operations associated with the system 120 of FIG. 1A, in some embodiments. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, a module configured to identify posts related to software patches may be included in the data storage 254 as program instructions. The processor 250 may fetch the program instructions of the module from the data storage 254 and may load the program instructions of the module in the memory 252. After the program instructions of the module are loaded into memory 252, the processor 250 may execute the program instructions such that the computing system may implement the operations associated with the module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
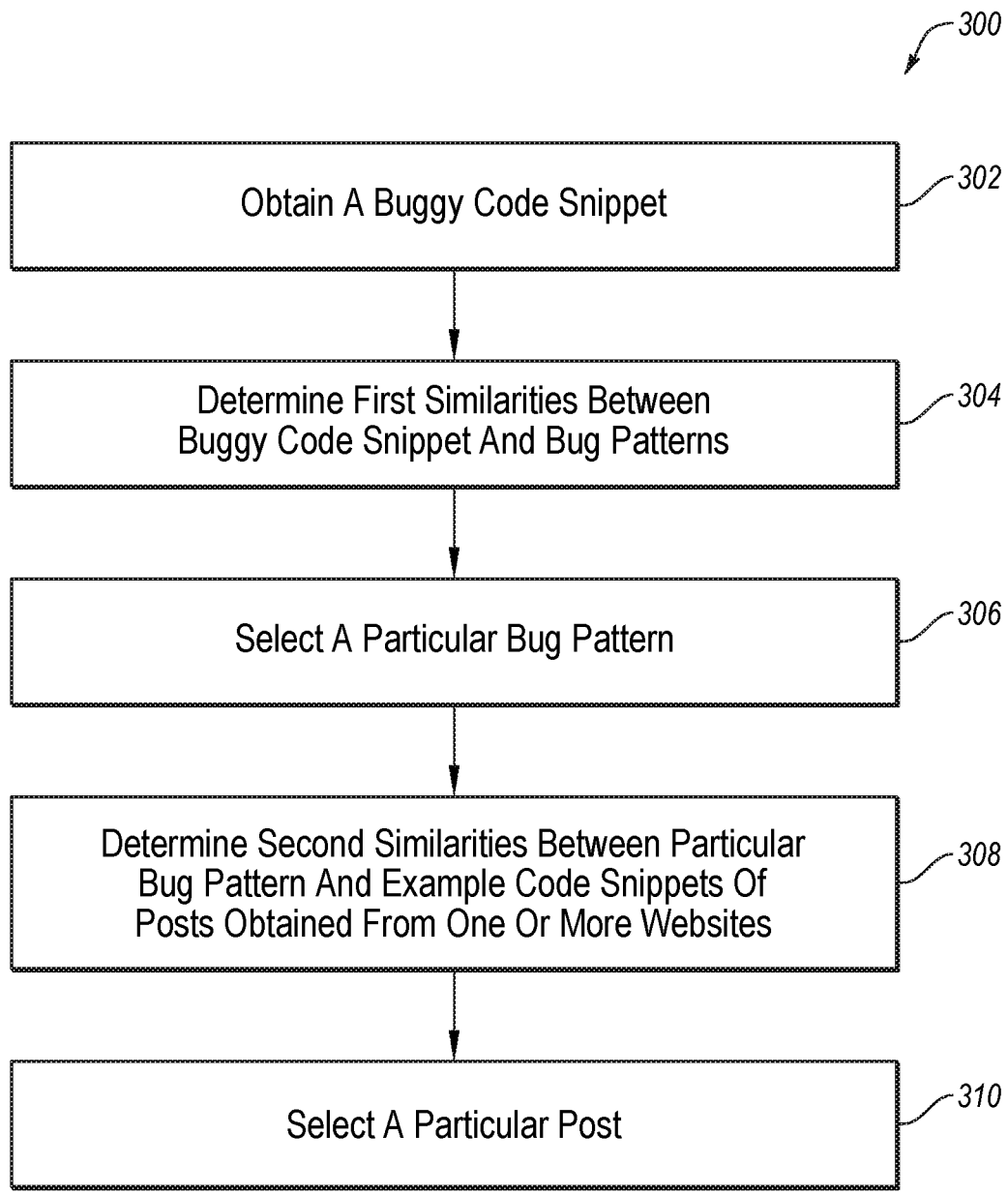
FIG. 3 is a flowchart of an example method of identifying posts related to software patches.

FIG. 3 is a flowchart of an example method 300 of identifying posts related to software patches, according to at least one embodiment described in the present disclosure. The method 300 may be performed by any suitable system, apparatus, or device with respect to code under test of a software program. The code under test may include a portion or all of the source code of the software program. By way of example, the system 120 of FIG. 1A, or the computing system 202 of FIG. 2 (e.g., as directed by a module in some embodiments) may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 302, a buggy code snippet of the code under test may be obtained. The buggy code snippet may include lines of the code under test that may include a particular error. In some embodiments, the buggy code snippet may be obtained by performing one or more operations of FIG. 4, described in detail below.

At block 304, first similarities may be determined between the buggy code snippet and multiple bug patterns. For example, a respective first similarity may be determined between the buggy code snippet and each bug pattern of the multiple bug patterns. In some embodiments, the bug patterns may be obtained from a bug pattern library, such as the bug pattern library 150. In these or other embodiments, the obtained bug patterns may be associated with the software language of the code under test and may be formatted according to a corresponding DSL that is based on the software language. In these or other embodiments, the multiple bug patterns may be selected based on each of the selected bug patterns corresponding to a same type of error as the particular error of the buggy code snippet. Additionally or alternatively, the multiple bug patterns may be selected based on overlapping code elements (also referred to as "tokens") between the bug patterns and the buggy code snippet. For example, a keyword search may be performed to find all those bug patterns under an "IndexOutOfBoundsException" that are caused by a "substring( )" method.

In some embodiments, the first similarities may be determined by determining respective first similarity scores between the buggy code snippet and each of the obtained bug patterns. In these or other embodiments, the first similarity scores may be determined by performing one or more operations of FIG. 5, described in detail below.

At block 306, a particular bug pattern of the multiple bug patterns may be selected based on a particular first similarity between the particular bug pattern and the buggy code snippet. For example, in some embodiments, the first similarities may include respective first similarity scores and the respective first similarity scores may be ranked according to indication of similarity. In these or other embodiments, the particular bug pattern may be selected based on the particular first similarity score indicating a highest degree of similarity of the particular bug pattern with respect to the buggy code snippet as compared to the other first similarity scores of the other bug patterns. Additionally or alternatively, the particular bug pattern may be selected based on the particular first similarity score satisfying a certain threshold. The threshold may be determined using any suitable observational analysis in some embodiments.

At block 308, second similarities may be determined between the particular bug pattern selected at block 306 and example code snippets that may be obtained from posts which may be obtained from one or more websites. For example, a respective second similarity may be determined between the particular bug pattern and each example code snippet. In some embodiments, the posts may be obtained such as described above with respect to FIG. 1A.

In some embodiments, the second similarities may be determined by determining respective second similarity scores between the particular bug pattern and each of the obtained example code snippets. In these or other embodiments, the second similarity scores may be determined by performing one or more operations of FIG. 5, described in detail below.

At block 310, a particular post of the multiple posts may be selected as providing a potential solution to correct the particular error of the buggy code snippet. The particular post may be selected based on a particular second similarity between the particular bug pattern and a particular example code snippet of the particular post. For example, in some embodiments, the second similarities may include respective second similarity scores and the respective second similarity scores may be ranked according to indication of similarity. In these or other embodiments, the particular post may be selected based on the particular second similarity score indicating a highest degree of similarity of the particular example code snippet with respect to the particular bug pattern as compared to the other second similarity scores of the other example code snippets of the other example posts. Additionally or alternatively, the particular post may be selected based on the particular second similarity score satisfying a certain threshold. The threshold may be determined using any suitable observational analysis in some embodiments.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 300 may include additional blocks or fewer blocks. For example, in some embodiments, the method 300 may include one or more operations related to performing repair operations on the code under test based on the selected particular post. For instance, the particular example code snippet of the particular post may include a patch that may be applied to the buggy code snippet. Additionally or alternatively, the particular post may be presented to the developer of the code under test as a providing a potential solution to the particular error of the buggy code snippet.

Figure 4:
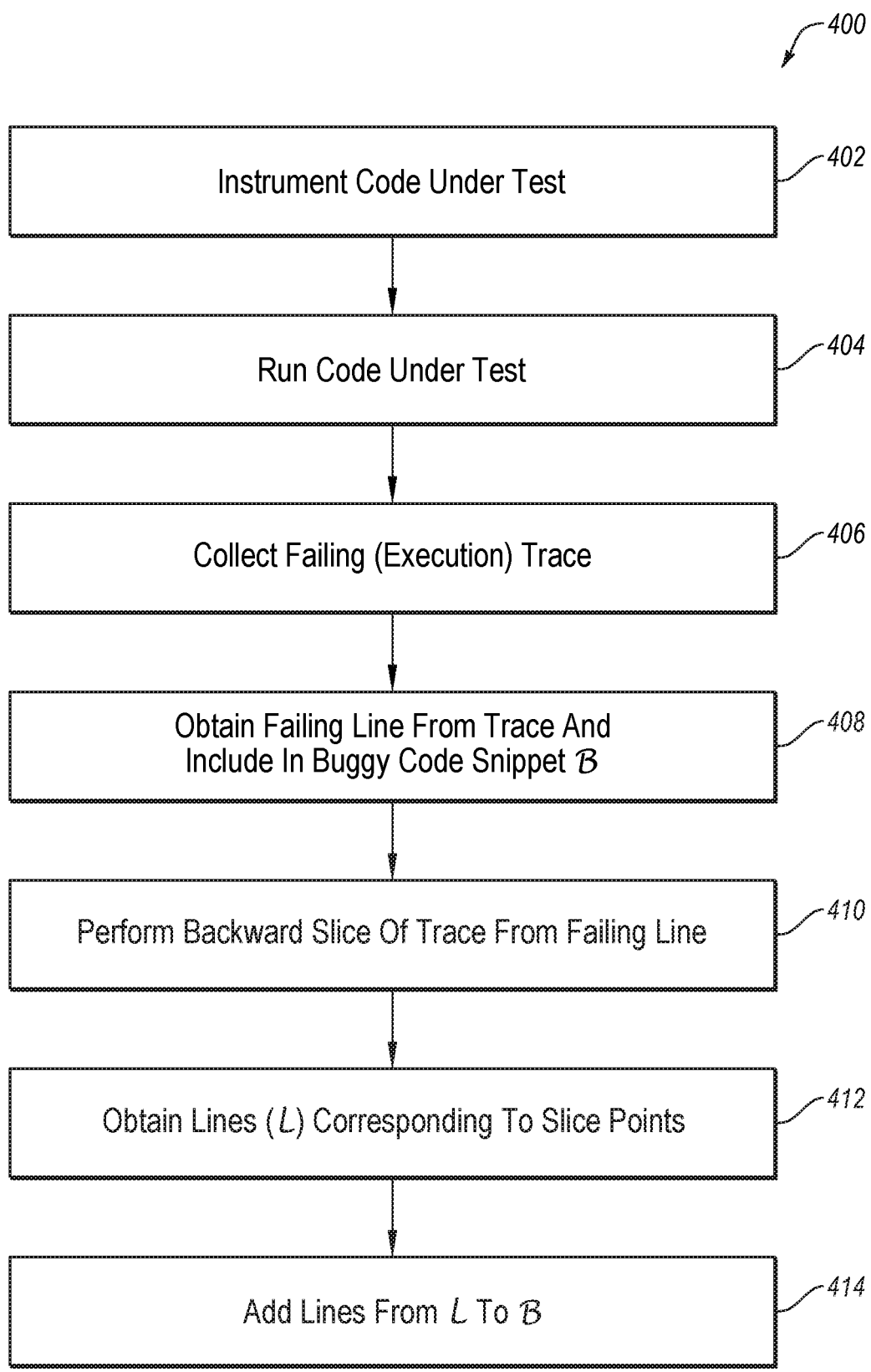
FIG. 4 is a flowchart of an example method of obtaining a buggy code snippet from code under test.

FIG. 4 is a flowchart of an example method 400 of obtaining a buggy code snippet from code under test, according to at least one embodiment described in the present disclosure. The method 400 may be performed by any suitable system, apparatus, or device with respect to code under test of a software program. The code under test may include a portion or all of the source code of the software program. By way of example, the system 120 of FIG. 1A, or the computing system 202 of FIG. 2 (e.g., as directed by a module in some embodiments) may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation. In some embodiments, one or more of the operations of the method 400 may be performed with respect to block 302 of FIG. 3.

At block 402, the code under test may be instrumented. The instrumentation may add code to the code under test such that statements that are executed during a test execution are tracked. At block 404, the instrumented code under test may be run. During the running of the instrumented code under test, an error in the code under test may be encountered and/or identified.

At block 406, a failing trace may be collected. The failing trace may include those statements or lines of code that may have been executed during the test execution that may have been tracked by the instrumentation. At block 408, a line of code that may have failed ("failing line") (e.g., caused the error to occur) during the test execution may be identified. In some embodiments, the failing line may be selected as a line to be included in a buggy code snippet "$\mathcal{B}$". In some embodiments, the failing line may be the first line of code added to the buggy code snippet such that the failing line may be used to initialize the buggy code snippet.

At block 410, a backward slicing of the failing trace may be performed. In some embodiments, the backward slicing may begin at the failing line and may step through, as "slices" in reverse order starting at the failing line, the statements and/or lines of code executed during failing test execution, as indicated by the failing trace. In some embodiments, the backward slicing may be limited to intra-procedural elements of the failing trace with respect to the failing line. For example, the failing line may be part of a particular element of the source code such as a method or class. In these or other embodiments, the backwards slicing may be performed until reaching the statement that began executing the method or class to which the failing line corresponds.

At block 412, lines of code "$\mathcal{L}$ L" that correspond to the slices encountered during the backward slicing may be obtained. At block 414, the lines "$\mathcal{L}$" may be added to the buggy code snippet "$\mathcal{B}$" initialized at block 408 to obtain a finalized buggy code snippet. In some The finalized buggy code snippet may be the buggy code snippet used and analyzed in the method 300 in some embodiments.

One skilled in the art will appreciate that, for this and other processes, operations, and methods disclosed herein, the performance of the functions and/or operations of the method 400 may be implemented in differing order than described. For example, the lines "$\mathcal{L}$" may be identified and added to the buggy code snippet in an iterative manner and/or a parallel manner. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks or fewer blocks.

Figure 5:
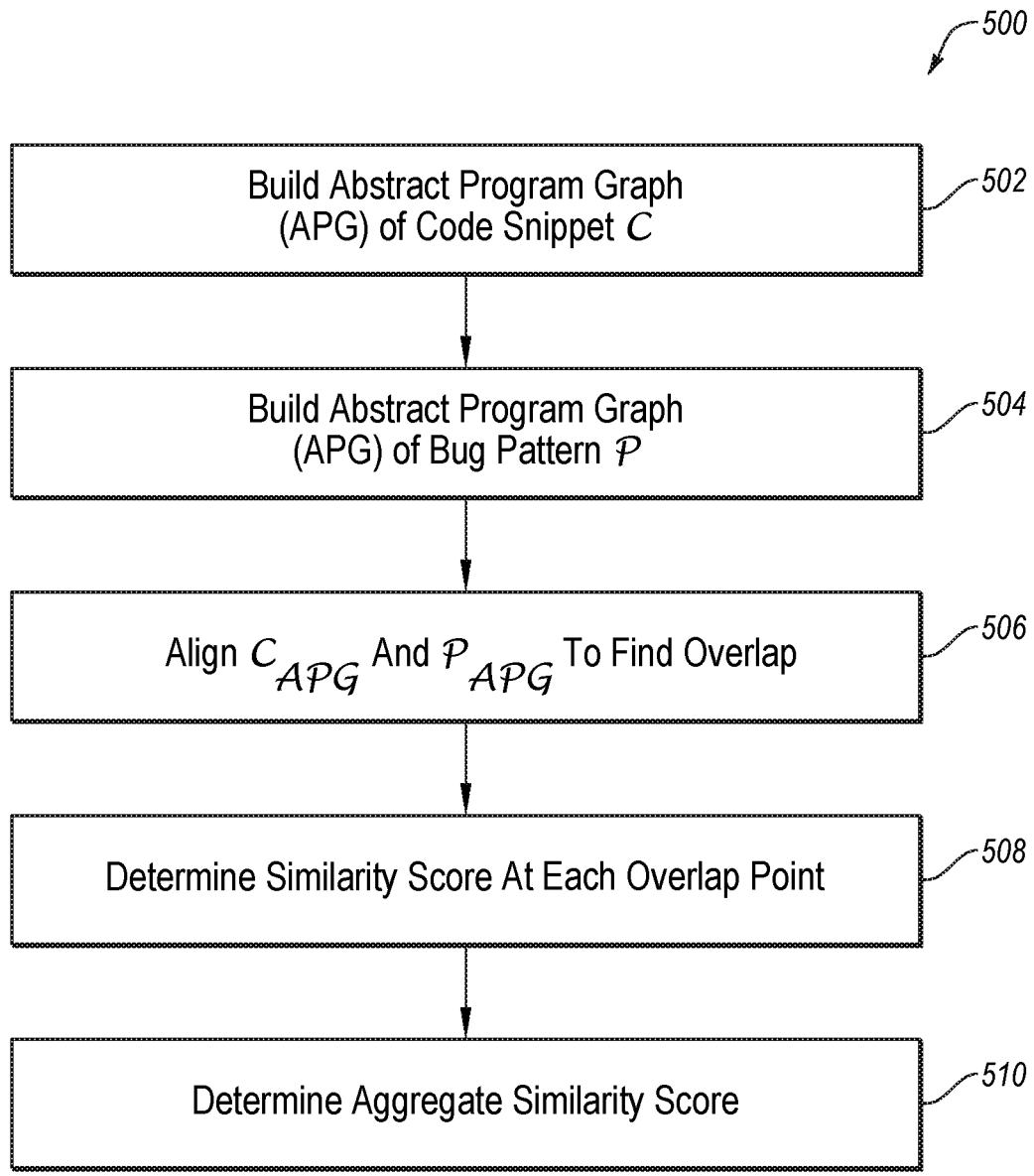
FIG. 5 is a flowchart of an example method of determining a similarity between a code snippet and a bug pattern.

FIG. 5 is a flowchart of an example method 500 of determining a similarity between a code snippet and a bug pattern, according to at least one embodiment described in the present disclosure. The method 500 may be performed by any suitable system, apparatus, or device. By way of example, the system 120 of FIG. 1A, or the computing system 202 of FIG. 2 (e.g., as directed by a module in some embodiments) may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

In some embodiments, one or more of the operations of the method 500 may be performed with respect to block 304 and/or block 308 of FIG. 3. For example, in performing the method 500 with respect to block 304, the code snippet that may be analyzed and used with the method 500 may include the buggy code snippet that may be identified at block 302 of FIG. 3. Additionally or alternatively, the operations of the method 500 may be performed with respect to the buggy code snippet and each of the multiple bug patterns that may be identified at block 304. As another example, in performing the method 500 with respect to block 308, the code snippet that may be analyzed and used with the method 500 may include one of the example code snippets of the posts. Additionally or alternatively, the operations of the method 500 may be performed with respect to the selected particular bug pattern and each of the multiple example code snippets of the obtained posts.

At block 502, a first abstract program graph of a code snippet "$C$" may be generated. As indicated above, the code snippet may be a buggy code snippet or an example code snippet in some embodiments. In some embodiments, the first abstract program graph may be generated by obtaining an abstract syntax tree of the code snippet. Further, the abstract syntax tree may be modified into the first abstract program graph by a process of simplification, type inference (also referred to as "concretization"), and abstraction of the abstract syntax tree.

As part of simplification, the abstract syntax tree may be parsed and compressed to make the tree compact and readable. In some embodiments, parsing and compressing the abstract syntax tree may include combining multiple nodes of the abstract syntax tree into a single node in a resulting abstract tree representation. For example, an abstract syntax tree may include a node for every token in a software program. For example, the statement in the source "int a;" may be represented in an abstract syntax tree as a series of nodes including statement nodes, expression nodes, variable nodes, etc. As part of simplification, the nodes in the abstract syntax tree associated with the statement in source code "int a;" may be parsed and compressed into a single node in the abstract tree representation, a "declare (int, a)" node. Parsing the source code may include dividing a statement in a source code into a construct, a type (i.e., a variable type), and a variable name. For example, constructs may include functions of statements in source code. For the "declare (int, a)" node above, the construct may be "declare", the type may be "int", and the variable name may be "a". Constructs may include loops such as "for", "foreach", "while", conditions such as "if", declarations and constructors, methods such as "delete" and "insert", etc. Types may include "integers" ("int"), floating point numbers ("float"), strings, Booleans, collections, etc.

During type inference, data types of variables may be inferred. Type inference may include determining an inferred type of a variable based on the usage of the variable in the source code. For example, variables used in loops such as "for" loops may be inferred to be integers even if the variable is not explicitly defined as such in the software program, abstract syntax tree, and/or compressed abstract syntax tree. As an additional example, a statement in the source code may include "if (flag)". The data type of the variable "flag" may not be identified in the source code; however, based on the usage of the variable "flag" in the "if" statement, it may be inferred that "flag" is a variable of the "Boolean" type. Thus, the statement "if (flag)" may be converted in the tree representation to a "root" node, an additional "declare (Boolean, flag)" node, and an "if (flag)" node. Similarly, type inference may involve inferring a method scope or caller and inferring variable values. During type inference, nodes may be added to the abstract tree representation that may not be present in the abstract syntax tree.

During abstraction, differing constructs may be generalized to a single construct. In these and other embodiments, data types of variables may be abstracted. During abstraction, primitive data types, such as integers, floating point numbers, characters, strings, and Booleans, may remain without abstraction. Some data types may include application specific and/or user defined types. These data types may be converted into generic type variables. Alternatively or additionally, during abstraction, identifier names may be abstracted. For example, a first variable name "list" may be abstracted to a name "$v1" and a second variable name "s" may be abstracted to "$v2." Alternatively or additionally, during abstraction, constructs may be generalized. For example, "for", "for-each", and "while" may each be abstracted to a "loop" construct. Additionally or alternatively, during abstraction, duplicate subtrees may be abstracted and refactored.

Additional details regarding the process of simplification, type inference and abstraction of the abstract syntax tree may be found in U.S. patent application Ser. No. 16/550,069, filed on Aug. 23, 2019 and incorporated by reference in the present disclosure in its entirety. Further, the first abstract program graph may be generated using any other applicable technique other than that described above.

At block 504, a second abstract program graph of a bug pattern "$\mathcal{P}$" may be generated. As indicated above, the bug patterns may include genericized code snippets, of which a corresponding second abstract program graph may be generated. The second abstract program graph may be generated in an analogous manner as the generation of the first abstract program graph that is generated at block 502 in some embodiments.

At block 506, the first abstract program graph and the second abstract program graph may be aligned. Additionally or alternatively, the aligning may be performed to determine an overlap between the first abstract program graph and the second abstract program graph. The aligning may be performed using any suitable technique. For example, in some embodiments, the aligning may be based on determining tree edit distances between the first abstract program graph and the second abstract program graph.

Tree edit distance may be a representation of the degree of similarity and/or dissimilarity of different trees (e.g., between the first abstract program graph and the second abstract program graph). For example, the tree edit distance may be computed. Based on the tree edit distance, the alignment between the first abstract program graph and the second abstract program graph be determined, i.e., it may be determined which nodes of first abstract program graph correspond to which nodes of the second abstract program graph. The tree edit distance may be determined based on the minimum number of operations needed to convert one of the two trees into the other tree. In these and other embodiments, the operations may include deletion operation (e.g., where a first tree includes a node the second tree lacks), an addition operation (e.g., where the first tree lacks a node the second tree includes), and a match operation (where a node on the first tree matches a node on the second tree in terms of content but the contexts of the two nodes may not necessarily match completely), among other operations.

At block 508, a respective similarity score may be determined with respect to one or more overlapping nodes of the first abstract program graph and the second abstract program graph. In some embodiments, a respective similarity score may be determined between each of the overlapping nodes. The respective similarity score may indicate a degree of similarity between the corresponding identified overlapping nodes. In some embodiments, the respective similarity score may be weighted.

In some embodiments, the respective similarity score may be computed based on multiple factors. For example, the respective similarity score may be based on construct similarity, type similarity, and variable-use relationship similarity, among other factors. In some embodiments, construct similarity may be present when overlapping nodes in abstract tree representation include the same construct. For example, when both overlapping nodes are "declare" constructs, there may be construct similarity. As discussed above, constructs may include "declare", "constructor", "loop", "method", "if", among others. In some embodiments, type similarity may be determined in response to determining there is construct similarity. In these and other embodiments, type similarity may be present when overlapping nodes in abstract tree representation include the same construct and the same type. For example, when both overlapping nodes are "declare" constructs and include "integer" types, there may be type similarity. As discussed above, types may include "Boolean", "collection", "string", "integer", "float", among others. In some embodiments, variable-use similarity may be determined in response to determining there is construct similarity and type similarity. In these and other embodiments, variable-use similarity may be present when a variable is used in similar manners in both overlapping nodes. For example, when a variable is used in a loop and a remove method in both the abstract tree representation of the software program code snippet and the pattern, there may be variable-use similarity. In some embodiments, variable-use similarity may be determined using the Jaccard index.

The respective similarity score may be calculated as Similarity Score=(weight$_A$×construct similarity)+(weight$_B$×type similarity)+(weight$_C$×variable-use relationship similarity). In these and other embodiments, the construct similarity may be a number of overlapping nodes with matching constructs. In these and other embodiments, the type similarity may be a number of overlapping nodes with both matching constructs and matching types. In these and other embodiments, the variable-use relationship similarity may be a number of instances in which variables are used in the same or similar situations. Alternatively or additionally, in some embodiments, the variable-use relationship similarity may be measured as the Jaccard index, J, which, as discussed above, may be determined as the size of the intersection of the number of places a variable is used in the code snippet of the software program, $V_{SP}$ and number of places the corresponding variable appearing in a matching node in the pattern is used in the pattern, $V_P$, divided by the size of the union, $$J(V_{SP}, V_P) = \frac{|V_{SP} \cap V_P|}{|V_{SP} \cup V_P|} = \frac{|V_{SP} \cap V_P|}{|V_{SP}| + |V_P| - |V_{SP} \cap V_P|}.$$

In some embodiments, different factors may have different weights. For example, weight$_A$ associated with construct similarity may be 0.5, weight$_B$ associated with type similarity may be 2.0, and weight$_C$ associated with variable-relationship use similarity may be 1.0.

The above is given as an example of computing the respective similarity score of the overlapping nodes. However, any other suitable technique for determining a degree of similarity may also be used.

At block 510, an aggregate similarity score may be determined. The aggregate similarity score may be an aggregate of the overlapping node similarity scores determined at block 508. For example, the aggregate similarity score may be an average of the overlapping node similarity scores in some embodiments. As another example, the aggregate similarity score may be a raw sum of the overlapping node similarity scores or the raw sum normalized to a specific range (e.g., from "0" to "1"). The aggregate similarity score may indicate an overall degree of similarity between the code snippet "$C$" and the bug pattern "$\mathcal{P}$".

One skilled in the art will appreciate that, for this and other processes, operations, and methods disclosed herein, the functions and/or operations performed with respect to the method 500 may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 500 may include additional blocks or fewer blocks. For example, in some embodiments, the operations of the method 500 may be repeated until every line of the particular code snippet has been analyzed for undefined tokens.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." This interpretation of the phrase "A or B" is still applicable even though the term "A and/or B" may be used at times to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining a buggy code snippet of source code of a software program in which the buggy code snippet includes a particular error;
   determining a respective first similarity between the buggy code snippet and each of a plurality of bug patterns of previously identified bug scenarios;
   selecting a particular bug pattern from the plurality of bug patterns based on a determined particular first similarity between the particular bug pattern and the buggy code snippet, wherein determining the particular first similarity includes:
   building a first Abstract Program Graph (APG) that represents the buggy code snippet;
   building a second APG that represents the particular bug pattern; and
   determining the particular first similarity based on overlap between the first APG and the second APG;
   determining a respective second similarity between the particular bug pattern and each of a plurality of example code snippets each obtained from a respective post of a plurality of posts obtained from one or more websites; and selecting, from the plurality of posts, a particular post as providing a potential solution to correct the particular error of the buggy code snippet based on a determined particular second similarity between the particular bug pattern and a particular example code snippet of the particular post, wherein determining the particular second similarity includes:

building a third APG that represents the particular example code snippet; and determining the particular second similarity based on overlap between the second APG and the third APG.

2. The method of claim 1, further comprising performing one or more repair operations with respect to the particular error based on the selected post.

3. The method of claim 1, wherein selecting the particular bug pattern from the plurality of bug patterns includes:

determining a similarity score that indicates the particular first similarity between the particular bug pattern and the buggy code snippet; and selecting the particular bug pattern in response to the similarity score indicating that the particular bug pattern has a highest degree of similarity with the buggy code snippet as compared to the other bug patterns of the plurality of bug patterns.

4. The method of claim 1, wherein selecting the particular post from the plurality of posts includes:

determining a similarity score that indicates the particular second similarity between the particular bug pattern and the particular example code snippet; and selecting the particular post in response to the similarity score indicating that the particular example code snippet has a highest degree of similarity with the particular bug pattern as compared to the other posts of the plurality of posts.

5. The method of claim 1, wherein each of the plurality of bug patterns is formatted according to a syntax of a software language of the software program.

6. The method of claim 5, wherein the syntax includes one or more of a plurality of characteristics in which the plurality of characteristics includes:

supporting semantic abstractions that allow for specifying of different methods that are of a similar type as exhibiting common semantic behavior;

using wildcards to abstract out particular program elements; and allowing for expressing numeric constraints on values.

7. One or more non-transitory computer-readable storage media configured to store instructions that, in response to being executed, cause a system to perform operations, the operations comprising:

obtaining a buggy code snippet of source code of a software program in which the buggy code snippet includes a particular error;

determining a respective first similarity between the buggy code snippet and each of a plurality of bug patterns of previously identified bug scenarios;

selecting a particular bug pattern from the plurality of bug patterns based on a determined particular first similarity between the particular bug pattern and the buggy code snippet, wherein determining the particular first similarity includes:

building a first Abstract Program Graph (APG) that represents the buggy code snippet;

building a second APG that represents the particular bug pattern; and determining the particular first similarity based on overlap between the first APG and the second APG;

determining a respective second similarity between the particular bug pattern and each of a plurality of example code snippets each obtained from a respective post of a plurality of posts obtained from one or more websites; and selecting, from the plurality of posts, a particular post as providing a potential solution to correct the particular error of the buggy code snippet based on a determined particular second similarity between the particular bug pattern and a particular example code snippet of the particular post, wherein determining the particular second similarity includes:

building a third APG that represents the particular example code snippet; and determining the particular second similarity based on overlap between the second APG and the third APG.

8. The one or more computer-readable storage media of claim 7, wherein the operations further comprise performing one or more repair operations with respect to the particular error based on the selected post.

9. The one or more computer-readable storage media of claim 7, wherein selecting the particular bug pattern from the plurality of bug patterns includes:

determining a similarity score that indicates the particular first similarity between the particular bug pattern and the buggy code snippet; and selecting the particular bug pattern in response to the similarity score indicating that the particular bug pattern has a highest degree of similarity with the buggy code snippet as compared to the other bug patterns of the plurality of bug patterns.

10. The one or more computer-readable storage media of claim 7, wherein selecting the particular post from the plurality of posts includes:

determining a similarity score that indicates the particular second similarity between the particular bug pattern and the particular example code snippet; and selecting the particular post in response to the similarity score indicating that the particular example code snippet has a highest degree of similarity with the particular bug pattern as compared to the other posts of the plurality of posts.

11. The one or more computer-readable storage media of claim 7, wherein each of the plurality of bug patterns is formatted according to a syntax of a software language of the software program.

12. The one or more computer-readable storage media of claim 7, wherein the syntax includes one or more of a plurality of characteristics in which the plurality of characteristics includes:

supporting semantic abstractions that allow for specifying of different methods that are of a similar type as exhibiting common semantic behavior;

using wildcards to abstract out particular program elements; and allowing for expressing numeric constraints on values.

13. A system comprising:

one or more processors; and one or more non-transitory computer-readable storage media configured to store instructions that, in response to being executed by the one or more processors, cause the system to perform operations, the operations comprising:

obtaining a buggy code snippet of source code of a software program in which the buggy code snippet includes a particular error;

determining a respective first similarity between the buggy code snippet and each of a plurality of bug patterns of previously identified bug scenarios;

selecting a particular bug pattern from the plurality of bug patterns based on a determined particular first similarity between the particular bug pattern and the buggy code snippet, wherein determining the particular first similarity includes:

building a first Abstract Program Graph (APG) that represents the buggy code snippet;

building a second APG that represents the particular bug pattern; and determining the particular first similarity based on overlap between the first APG and the second APG;

determining a respective second similarity between the particular bug pattern and each of a plurality of example code snippets each obtained from a respective post of a plurality of posts obtained from one or more websites; and selecting, from the plurality of posts, a particular post as providing a potential solution to correct the particular error of the buggy code snippet based on a determined particular second similarity between the particular bug pattern and a particular example code snippet of the particular post, wherein determining the particular second similarity includes:

building a third APG that represents the particular example code snippet; and determining the particular second similarity based on overlap between the second APG and the third APG.

14. The system of claim 13, wherein selecting the particular bug pattern from the plurality of bug patterns includes:

determining a first similarity score that indicates the particular first similarity between the particular bug pattern and the buggy code snippet;

selecting the particular bug pattern in response to the first similarity score indicating that the particular bug pattern has a highest degree of similarity with the buggy code snippet as compared to the other bug patterns of the plurality of bug patterns;

determining a second similarity score that indicates the particular second similarity between the particular bug pattern and the particular example code snippet; and selecting the particular post in response to the second similarity score indicating that the particular example code snippet has a highest degree of similarity with the particular bug pattern as compared to the other posts of the plurality of posts.

15. The system of claim 13, wherein each of the plurality of bug patterns is formatted according to a syntax of a software language of the software program.

* * * * *